United States Patent [19]

Krizan

[11] Patent Number: 5,267,480
[45] Date of Patent: Dec. 7, 1993

[54] TELESCOPING COLUMN

[75] Inventor: Joseph A. Krizan, Sturgis, Mich.

[73] Assignee: Douglas Autotech Corporation, Bronson, Mich.

[21] Appl. No.: 911,952

[22] Filed: Jul. 10, 1992

[51] Int. Cl.$^5$ .............................................. B62D 1/18
[52] U.S. Cl. .................................... 74/493; 29/517; 74/531; 403/370; 403/374; 464/162
[58] Field of Search ............... 29/517, 520; 74/493, 74/531; 403/370, 374; 280/279; 464/162

[56] References Cited

U.S. PATENT DOCUMENTS

| | | | |
|---|---|---|---|
| 2,733,885 | 2/1956 | Brown et al. | 403/109 |
| 3,276,287 | 10/1966 | Albrecht | 74/493 |
| 3,293,884 | 12/1966 | Grob | 464/162 |
| 3,434,368 | 3/1969 | Runkle | 74/493 |
| 3,473,406 | 10/1969 | Runkle | 74/493 |
| 3,491,663 | 1/1970 | Morgan | 74/493 |
| 3,791,223 | 2/1974 | Treichel et al. | 74/493 |
| 3,955,828 | 5/1976 | Boudreau | 280/279 |
| 4,257,624 | 3/1981 | Hansen | 280/775 |
| 4,347,757 | 9/1982 | Martin | 74/493 |
| 4,402,236 | 9/1983 | Nishikawa | 74/493 |
| 4,418,582 | 12/1983 | Martin | 74/493 |
| 4,463,625 | 8/1984 | Nishikawa | 74/493 |
| 4,475,744 | 10/1984 | Leutz | 74/493 X |
| 4,481,838 | 11/1984 | Findley et al. | 74/493 |
| 4,516,440 | 5/1985 | Nishikawa | 74/493 |
| 4,539,861 | 9/1985 | Nishikawa | 74/493 |
| 4,541,299 | 9/1985 | Kanaya et al. | 74/493 |
| 4,572,022 | 2/1986 | Mettler | 74/492 |
| 4,572,023 | 2/1986 | Euler | 74/493 |
| 4,619,548 | 10/1986 | Kazaoka et al. | 74/493 X |
| 4,667,530 | 5/1987 | Mettler et al. | 74/493 |
| 4,693,136 | 9/1987 | Clerc et al. | 74/492 |
| 4,813,910 | 3/1989 | Stone | 74/493 X |
| 4,909,095 | 3/1990 | Carlson | 74/493 |
| 4,911,034 | 3/1990 | Kulczyk et al. | 74/492 |

FOREIGN PATENT DOCUMENTS

| | | | |
|---|---|---|---|
| 1191989 | 5/1970 | United Kingdom | 74/493 |
| 1196738 | 7/1970 | United Kingdom | 74/493 |
| 2105441 | 3/1983 | United Kingdom | 74/492 |

Primary Examiner—Allan D. Herrmann
Attorney, Agent, or Firm—Price, Heneveld, Cooper, DeWitt & Litton

[57] ABSTRACT

A telescoping steering column has a tube and a shaft. The shaft has a slide portion at one end and a midregion adjacent the slide portion. The slide portion and at least a portion of the midregion are received in sliding engagement in the tube. The tube has a crimp which is formed about a portion of the midregion and slidably engages the midregion. Rotational torque is transmitted between the shaft and the tube through the midregion and crimp. Further, the slide portion of the shaft abuts the crimp and is blocked from passing through the crimp. Finally, a slide lock is provided to fix the position of the shaft relative to the tube in a locked position and whereby the shaft slides relative to the tube in an unlocked position.

39 Claims, 2 Drawing Sheets

TELESCOPING COLUMN

BACKGROUND OF THE INVENTION

The present invention relates to steering columns for a variety of vehicles or vessels and more particularly relates to such columns which have a telescoping feature.

Various telescoping steering columns are available today in a variety of vehicles. The basic structure of a telescoping steering column commonly includes a tube portion connected with a steering gear and a shaft portion slidably received in the tube. One end of the shaft will project from the tube and couple with a steering wheel or the like. Also, rotational torque must be transmitted between the shaft and the tube. This torque transmission is commonly accomplished by machining cooperating splines on the outer surface of the shaft and the inner surface of the tube. However, this is an expensive machining operation and makes the telescoping steering column a costly option.

A modification of the spline approach is to form each of the shaft and the tube with cooperating cross-sectional shapes which will preclude rotation between the shaft and the tube and allow sliding of the shaft relative to the tube. These shapes commonly take the form of a polygon or modified polygon. However, this may again require expensive machining of the parts.

Another modification or alternative to the spline approach is to mill a keyway into one or both of the shaft and the tube and use a key extending between the shaft and the tube in the keyway. Clearly, this approach also requires machining to form the keyway and the key, which may be a separate part or a projection from one of the shaft and tube.

Another consideration in the design of a telescoping steering column is control of rotational lash. A certain tolerance must be allowed between the shaft and the tube to provide sufficient clearance for these parts to slide freely, one in the other. However, the tolerances which make the shaft and tube free sliding also introduce rotational lash or play between these components. The presence of lash emphasizes the need for close tolerance machining of the shaft and tube. Conversely, additional devices to take up the lash between coarsely formed shafts and tubes may be added to the telescoping steering column to hold the rotational lash within acceptable limits. However, these lash control devices also require machined components and add further complexity to the column.

Other components which are commonly required in a telescoping steering column are stops to define the range of axial travel of the telescoping motion. These stops are required for a number of reasons which may include keeping the column assembled, rather than allowing a user to simply pull the shaft out of the tube. Also, the splining or keying which transmits torque between the shaft and the column may not extend along the entire length of each of the shaft and tube so that stops are required to limit the steering column from being retracted or extended beyond the engagement of the splining or keying.

Taken all together, the various requirements for a properly functioning telescoping steering column commonly requires a considerable number of specially formed or machined parts to be assembled. Thus, the typical telescoping steering column may be a complex and costly device.

SUMMARY OF THE INVENTION

A telescoping column of the present invention addresses the problems discussed above. The present telescoping column has a shaft with a slide portion at one end and a midregion adjacent the slide portion. Each of the slide portion and midregion are adapted for sliding engagement in an axial direction with a bore formed coaxially through an end and at least a portion of a cooperating telescope tube. The tube also has a crimp which is aligned with the midregion and which is adapted for sliding engagement with the midregion and abutting engagement with the slide portion to block passage of the slide portion through the crimp. Further, the crimp and midregion are adapted for transmitting torque between the shaft and the tube. A slide lock is also provided between the shaft and the tube to fix the axial position of the shaft relative to the tube in a locked position and whereby the shaft slides relative to the tube in an unlocked position.

Thus, the present invention provides a simplified telescoping steering column. Each of the shaft and the tube are uncomplicated components and may even be stock components requiring minimal machining for the telescoping column application. A cooperating flat of the shaft midregion and swaging of the tube thereabout, forming a crimp, provide sliding coupling of the shaft and tube while the flat and crimp transfer rotational torque and control rotational lash. Thus, manufacturing costs may be significantly reduced. Further, additional lash control devices are not required since rotational lash control is addressed directly through the interaction of the shaft with the tube.

These and other objects, advantages, and features of the present invention will become apparent upon review of the following specification in conjunction with the drawings.

BRIEF DESCRIPTION OF THE DRAWINGS

FIG. 4 is a cross-sectional view taken at section line IV—IV of FIG. 3; and

FIG. 5 is a cross-sectional view taken at section line V—V of FIG. 3.

DESCRIPTION OF THE PREFERRED EMBODIMENT

Figure 1:
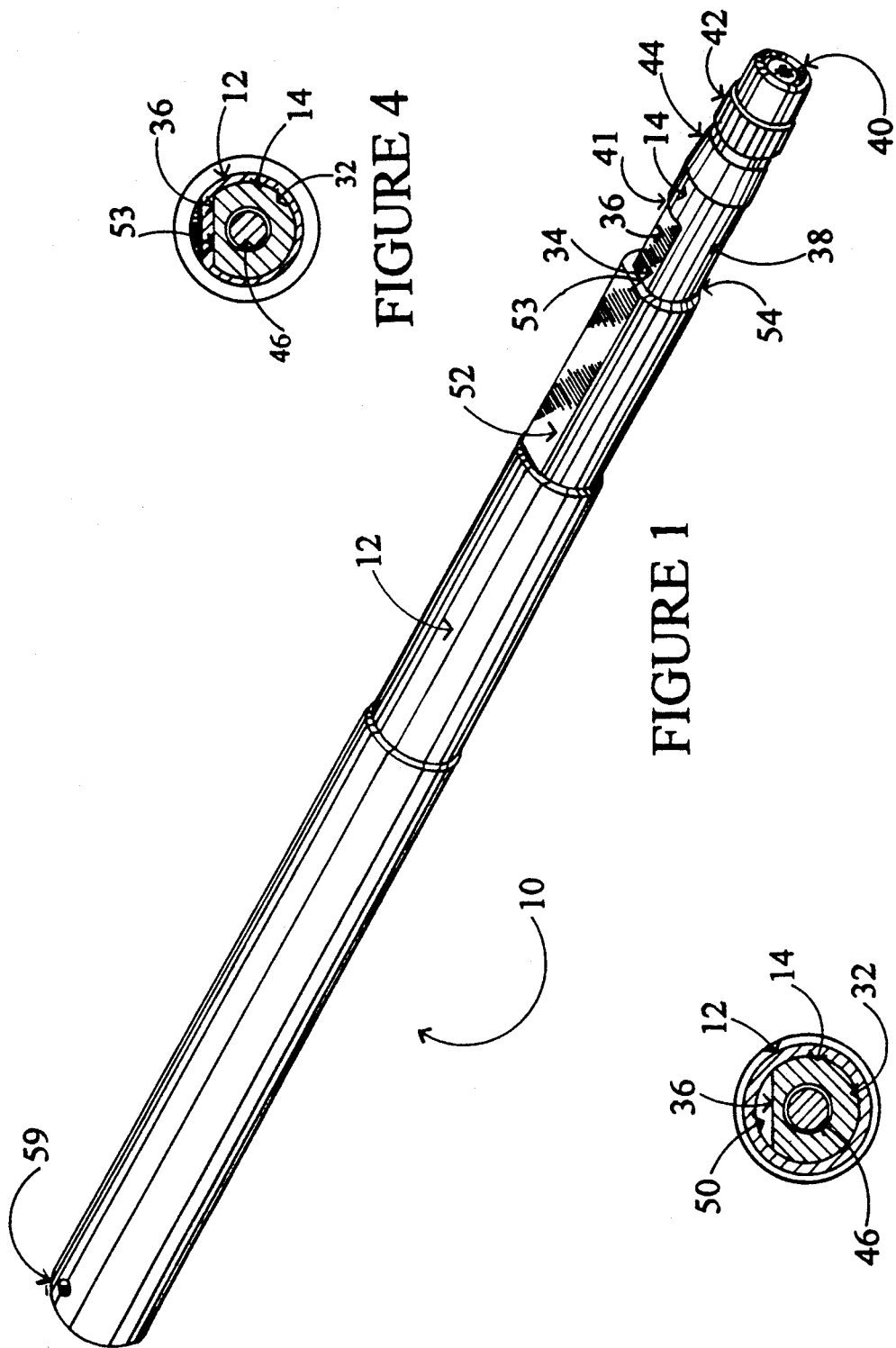
FIG. 1 is a perspective view of a telescoping column according to the present invention.
Figure 3:
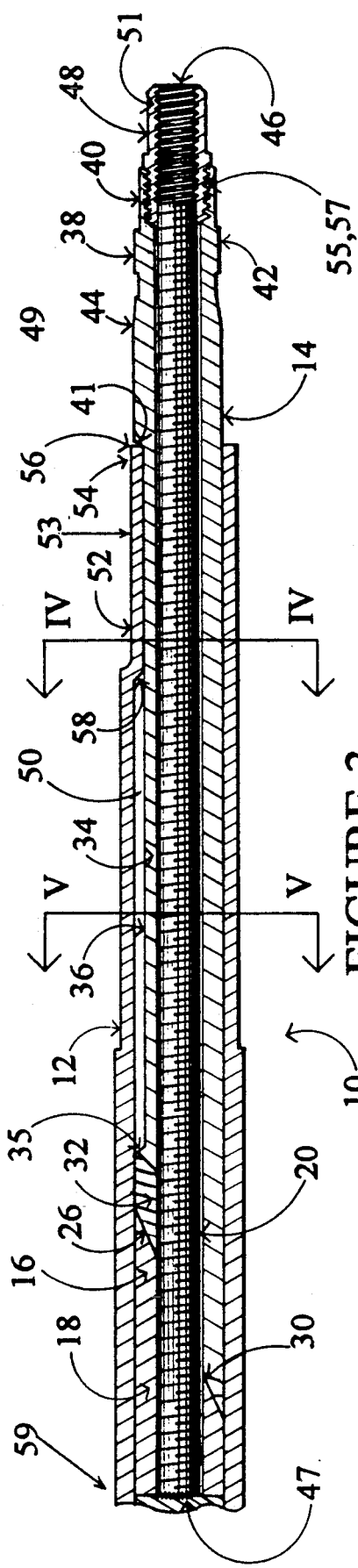
FIG. 3 is a centerline sectional view of the column of FIG. 1.

Referring to the drawing figures in greater detail, a preferred embodiment of a telescoping steering column 10 according to the present invention includes a telescope tube 12, a shaft 14 (FIGS. 1 and 3), and a slide lock 16 (FIG. 3). Tube 12 receives shaft 14 in sliding engagement to provide a steering column 10 having a telescoping length. The length of column 10 is releasably locked by slide lock 16, which prohibits relative sliding between tube 12 and shaft 14 when lock 16 is in a locked position.

Figure 2:
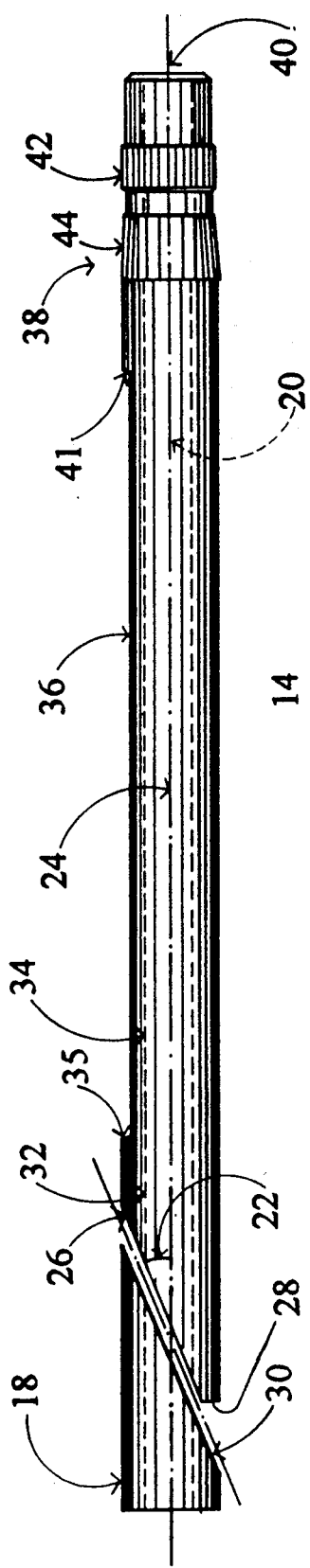
FIG. 2 is a side elevational view of the shaft portion of the column of FIG. 1.

Shaft 14 may be formed of any suitable engineering material, including metals and plastics, and is preferably a tubular steel member having a generally circular cross-sectional shape with a diameter of about 0.736 inches (18.7 millimeters) (FIGS. 2-5). Shaft 14 is preferably cut from a length of tubular material having an initial overall length of about 11 inches (280 millimeters) to form both shaft 14 and a cam member 18 (FIGS. 2 and 3). A lock aperture 20 of about 0.375 inches (9.52 millimeters) diameter is provided through the entire length of shaft 14 (FIG. 2).

As referred to above, shaft 14 is cut off from a length of material to and overall length of about 10.2 inches (259 millimeters) (FIG. 2). The cut is made askew relative to a longitudinal axis 24 of shaft 14 and most preferably defines an included angle 22 between the cut and axis 24 of about 22° 30'. This gives shaft 14 an inclined face 26 at one end 28 and provides cam member 18 with an identically matching cam surface 30 and an overall length of about 2.125 inches (54 millimeters).

A slide portion 32 is defined at end 28 by a midregion 34 of shaft 14 which is adjacent slide portion 32 and spaced from end 28 (FIGS. 2 and 3). Midregion 34 is defined by a flat area 36 formed on a side of shaft 14 over about 5.9 inches (150 millimeters) of the length of shaft 14. A first shoulder 35 is defined at one end of midregion 34 between the midregion and slide portion 32 (FIG. 2).

Midregion 34 may easily be formed or cut, by grinding or milling for example, into the side of shaft 14 and is preferably cut to a depth which maximizes the width of midregion 34 without compromising the strength of shaft 14. Maximizing the width of midregion 34 maximizes the transfer of rotational torque between shaft 14 and tube 12. As shown in the cross-sectional views of FIGS. 4 and 5, midregion 34 thus has a generally D-shaped cross section with a cross-sectional area defined within the outer surface of midregion 34 which is less than the cross-sectional area defined within the outer surface of slide portion 32.

Shaft 14 also has a head end 38 adjacent midregion 34 at a second end 40 of shaft 14, opposite one end 28 (FIG. 2). A second shoulder 41 is defined at a second end of midregion 34 opposite first shoulder 35, between midregion 34 and head end 38. Head end 38 is adapted to receive a steering grip, which will typically be a steering wheel and may also include a lever or the like, and is provided with a spline 42 and a taper 44 as are commonly known for this purpose.

A threaded control rod 46 extends through cam member 18, through a portion of lock aperture 20 which is in cam member 18 (FIG. 3). Rod 46 is attached to cam member 18 and may be attached by welding, cross-pinning, or other suitable methods. Rod 46 also extends through lock aperture 20 in shaft 14 and projects slightly from second end 40 of shaft 14 for coupling with a cooperating lock nut 48. Rod 46 preferably has right-hand screw threads and engages cooperating right-hand screw threads provided through lock nut 48. Left-hand screw threads are also provided on the outside of lock nut 48 and engage cooperating left-hand screw threads provided in lock aperture 20 at end 40 of shaft 14. Thus, lock nut 48 engages rod 46 through right-hand screw threads and engages lock aperture 20 through left-hand screw threads. Cam member 18, control rod 46, and lock nut 48 thus form slide lock 16 in cooperation with inclined face 26 of shaft 14.

Shaft 14 and slide lock 16 are received in sliding engagement in an axial direction in a bore 50 of tube 12 (FIG. 3). As with shaft 14, tube 12 may also be formed of any suitable engineering material, but the material used to form tube 12 is most preferably a malleable material for forming a crimp 52 at one end 54 of tube 12 as described further below Thus, tube 12 is preferably a tubular steel member having an inner wall forming bore 50 which extends through one end 54 of tube 12 and over at least a portion of the length of tube 12.

Bore 50 has a generally circular cross-sectional shape with a diameter of about 0.75 inches (19.05 millimeter), providing about 0.014 inches (0.35 millimeter) slide tolerance between shaft 14 and tube 12 as defined by the relative dimensions of the shaft and the tube. Further, bore 50 extends at least about 8.75 inches (222 millimeter) along the length of tube 12 from the end of the tube so that slide portion 32 and midregion 34 of shaft 14 may be fully received in tube 12 and only head end 38 will project from tube 12 when column 10 is in a fully retracted position as shown in FIG. 3.

With shaft 14 positioned in bore 50, crimp 52 is formed at end 54 of tube 12 by swaging tube 12 about midregion 34, conforming the inner wall of tube 12 to the shape and dimension of midregion 34. Since midregion 34 has a generally D-shaped cross section with flat area 36, crimp 52 has a cooperating, generally D-shaped cross section with a flat area 53. Engagement of flat area 36 with flat area 53 transfers rotational torque between shaft 14 and tube 12. Further, tube 12 is swaged about midregion 34 to allow sliding engagement of shaft 14 with tube 12 and to minimize rotational lash with a close tolerance fit between midregion 34 and crimp 52. Crimp 52 preferably extends about a 0.94 inch (24 millimeter) along the length of tube 12 from end 54. The relative lengths of crimp 52 and midregion 34 determine the telescoping range of column 10 as will be understood from the below discussion. Crimp 52 also forms a first stop 56 at one side 54 of the crimp and a second stop 58 at a second side of the crimp opposite first stop 56 (FIG. 3).

Column 10 may easily be assembled by assembling slide lock 16, comprising cam member 18, control rod 46, and lock nut 48, with shaft 14. This assembly of slide lock 16 with shaft 14 may then be positioned in tube 12 with slide portion 32 and a portion of midregion 34 slidably received in bore 50. A portion of midregion 34 thus remains outside tube 12 and tube end 54 is swaged about midregion 34 to define crimp 52 which conforms to the shape and dimension of midregion 34. Swaging tube 12 about midregion 34 provides torque transfer and lash control as discussed above.

In operation, the assembly of slide lock 16 with shaft 14 slides in unison in an axial direction relative to tube 12, providing a telescoping feature for steering column 10. Column 10 has a range of telescopic motion between a retracted position and an extended position. The limit of the retracted position is defined by abutting engagement between stop 56 of crimp 52 and shoulder 41 of midregion 3 as shown in FIG. 3. Conversely, the limit of the extended position is defined by stop 58 of crimp 52 abutting shoulder 35 of midregion 34 (extended position not shown).

The position of shaft 14 relative to tube 12 may be secured or locked anywhere between the extended and retracted positions by slide lock 16. As discussed above, control rod 46 is a threaded rod engaging cooperating lock nut 48 which in turn preferably engages lock aperture 20 through cooperating screw threads. The screw threads of each of control rod 46 and lock nut 48 ma be either left-hand or right-hand and will be presumed to be right-hand for the purposes of this discussion. The cooperating screw threads of each of lock aperture 20 and lock nut 48 may also be either right-hand or left-hand, but must be the opposite hand to the control rod 46 screw threads, and will be presumed to be left-hand for this discussion.

Thus, if slide lock 16 is in a locked position, shaft 14 may be released for sliding relative to tube 12 by rotating lock nut 48 in a counterclockwise direction as viewed from end 40 of shaft 14. This will "back off" lock nut 48 relative to control rod 46 and will also back off cam member 18 since control rod 46 is fastened with cam member 18. Lock nut 48 will also screw into lock aperture 20 with the effect of pushing control rod 46 through lock aperture and pushing cam member 18 away from shaft 14. Thus, having a first set of cooperating screw threads between lock nut 48 and control rod 46 and a second set of opposing cooperating screw threads between lock nut 48 and lock aperture 20 compounds the effect of rotating lock nut 48 and minimizes the extent to which lock nut 48 must be rotated to unlock or lock column 10.

While lock nut 48 is rotated and cam member 18 is pushed away from shaft 14, cam surface 30 and inclined face 26 slide relative to each other and cam member 18 aligns with shaft 14 in sliding engagement in bore 50. Shaft 14 is thus free to slide relative to tube 12 and may be positioned at any point of the telescoping range of column 10. Once a desired position is selected, column 10 may be locked by rotating lock nut 48 in a clockwise direction as viewed from end 40 of shaft 14.

While lock nut 48 is rotated in the clockwise direction, lock nut 48 both screws out of end 40 of shaft 14 and screws onto control rod 46 to draw control rod 46 through lock aperture 20 and out shaft end 40. Since cam member 18 is connected with control rod 46, cam face 30 is drawn tight against inclined face 26 and slides against inclined face 26 to ramp cam member 18 up inclined face 26 as viewed in FIG. 2, wedging cam member 18 between shaft 14 and tube 12, and providing friction locking between shaft 14 and tube 12.

The above description is considered that of the preferred embodiment only. Modifications of the invention will occur to those who make or use the invention, therefore, it is understood that the embodiment shown in the drawings and described above is merely for illustrative purposes and is not intended to limit the scope of the invention, which is defined by the following claims as interpreted to the principles of patent law.

The embodiments of the invention in which an exclusive property or privilege is claimed are defined as follows:

1. A telescoping steering column for a vehicle, comprising:
    a tube having a length extending along an axis and having an inner wall, said inner wall defining a shaft bore, said bore extending coaxially through an end of said tube and over at least a portion of said length;
    a shaft comprising an elongated member aligned coaxially with said tube, said shaft having a slide portion at one end and a midregion adjacent said slide portion, each of said slide portion and said midregion being adapted for sliding engagement in an axial direction with said shaft bore, said slide portion and at least a portion of said midregion being positioned in said shaft bore in sliding engagement with said shaft bore;
    said inner wall of said tube further defining a crimp, said crimp being aligned with said midregion, said crimp being adapted for sliding engagement with said midregion, and said crimp being adapted for abutting engagement with said slide portion to block said slide portion from passing through said crimp; and
    a slide lock connected between said shaft and said tube.

2. The column defined in claim 1 wherein said shaft further includes a head end, said head end being adjacent said midregion and opposite said one end, said head end being adapted for abutting engagement with said crimp.

3. The column defined in claim 2 wherein said head end is adapted to receive a steering grip for manipulation of said steering column by a user.

4. The column defined in claim 2 wherein:
    said shaft has a lock aperture extending coaxially through said shaft; and
    said slide lock includes a control rod adapted for manipulating said slide lock between a locked position wherein the axial position of said shaft relative to said tube is fixed, and an unlocked position wherein said shaft slides relative to said tube, said control rod being positioned in said lock aperture and extending through said lock aperture to a terminal end.

5. The column defined in claim 4 wherein:
    said control rod has a first set of screw threads extending over at least a portion of said control rod, from said terminal end;
    said slide lock further includes a lock nut having a first set of cooperating screw threads adapted to engage said first set of screw threads;
    said lock aperture has a second set of screw threads formed therein near said control rod terminal end, said second set of screw threads having a rotational orientation which is opposite to a rotational orientation of said first set of screw threads; and
    said lock nut having a second set of cooperating screw threads adapted to engage said lock aperture second set of screw threads.

6. The column defined in claim 5 wherein:
    said one end of said shaft terminates at an inclined face, said inclined face being a generally planar surface and oriented askew relative to said axis; and
    said slide lock further includes a cam member, said cam member having a cooperating cam surface for sliding engagement with said inclined face to wedge said cam member between said shaft and said tube when said slide lock is in said locked position.

7. The column defined in claim 5 wherein said shaft has a generally cylindrical outer surface and said shaft bore has a corresponding, generally circular cross-sectional shape.

8. The column defined in claim 7 wherein said midregion is defined by a flat area extending between said slide portion and said head end and said crimp has a corresponding, generally D-shaped cross-sectional shape.

9. The column defined in claim 8 wherein said crimp and said midregion transmit rotational torque between said tube and said shaft.

10. The column defined in claim 1 wherein:
    said shaft has a lock aperture extending coaxially through said shaft; and
    said slide lock includes a control rod adapted for manipulating said slide lock between a locked position wherein the axial position of said shaft relative to said tube is fixed, and an unlocked position wherein said shaft slides relative to said tube, said control rod being positioned in said lock aperture and extending through said lock aperture to a terminal end.

11. The column defined in claim 10 wherein:

said control rod has a first set of screw threads extending over at least a portion of said control rod, from said terminal end;

said slide lock further includes a lock nut having a first set of cooperating screw threads adapted to engage said first set of screw threads;

said lock aperture has a second set of screw threads formed therein near said control rod terminal end, said second set of screw threads having a rotational orientation which is opposite to a rotational orientation of said first set of screw threads; and said lock nut having a second set of cooperating screw threads adapted to engage said lock aperture second set of screw threads.

12. The column defined in claim 11 wherein:

said one end of said shaft terminates at an inclined face, said inclined face being a generally planar surface and oriented askew relative to said axis; and said slide lock further includes a cam member, said cam member having a cooperating cam surface for sliding engagement with said inclined face to wedge said cam member between said shaft and said tube when said slide lock is in said locked position.

13. The column defined in claim 1 wherein said shaft has a generally cylindrical outer surface and said shaft bore has a corresponding, generally circular cross-sectional shape.

14. The column defined in claim 13 wherein said midregion is defined by a flat area extending between said slide portion and said head end and said crimp has a corresponding, generally D-shaped cross-sectional shape.

15. The column defined in claim 14 wherein said crimp and said midregion transmit rotational torque between said tube and said shaft.

16. A telescoping steering column for a vehicle, comprising:

a first elongated member extending along an axis, said first member having a bore extending coaxially through a portion of said member and an aperture extending from said bore through one end of said first member;

a second elongated member extending along said axis, said second member having a first end portion adapted for sliding engagement in an axial direction with said bore and adapted for abutting engagement with said aperture, said second member also having a midregion adjacent said first end portion, said midregion being adapted for sliding engagement in an axial direction with each of said bore and said aperture, said first end portion being positioned in said bore in sliding engagement with said bore, at least a portion of said midregion being positioned in each of said bore and said aperture and in sliding engagement with each of said bore and said aperture;

torque means for transmitting torque between said first member and said second member in a rotational direction about said axis; and a slide lock connected between said first member and said second member.

17. The column defined in claim 16 wherein said second member further includes a second end adjacent said midregion and opposite said one end, said second end being adapted for abutting engagement with said aperture.

18. The column defined in claim 17 wherein said second member has a passage extending coaxially therethrough and said slide lock includes a control rod adapted for manipulating said slide lock between a locked position wherein the axial position of said second member relative to said first member is fixed, and an unlocked position wherein said second member slides relative to said first member, said control rod being positioned in and extending through said passage to a terminal end.

19. The column defined in claim 18 wherein:

said control rod has a first set of screw threads extending over at least a portion of said control rod, from said terminal end;

said slide lock further includes a lock nut having a first set of cooperating screw threads adapted to engage said first set of screw threads;

said second member passage has a second set of screw threads formed therein near said control rod terminal end, said second set of screw threads having a rotational orientation which is opposite to a rotational orientation of said first set of screw threads; and said lock nut having a second set of cooperating screw threads adapted to engage said second member passage second set of screw threads 20. The column defined in claim 19 wherein:

said first end of said second member terminates at an inclined face, said inclined face being a generally planar surface oriented askew relative to said axis; and said slide lock further includes a cam member, said cam member having a cooperating cam surface for sliding engagement with said inclined face to wedge said cam member between said second member and said first member when said slide lock is in said locked position.

21. The column defined in claim 20 wherein said second member has a generally cylindrical outer surface and said bore has a corresponding, generally cylindrical cross-sectional shape.

22. The column defined in claim 21 wherein said midregion is defined by a flat area extending between said first end and said second end and said aperture has a corresponding, generally D-shaped cross-sectional shape.

23. The column defined in claim 16 wherein said second member has a passage extending coaxially therethrough and said slide lock includes a control rod adapted for manipulating said slide lock between a locked position wherein the axial position of said second member relative to said first member is fixed, and an unlocked position wherein said second member slides relative to said first member, said control rod being positioned in and extending through said passage to a terminal end.

24. The column defined in claim 23 wherein:

said control rod has a first set of screw threads extending over at least a portion of said control rod, from said terminal end;

said slide lock further includes a lock nut having a first set of cooperating screw threads adapted to engage said first set of screw threads;

said second member passage has a second set of screw threads formed therein near said control rod terminal end, said second set of screw threads having a rotational orientation which is opposite to a rotational orientation of said first set of screw threads; and said lock nut having a second set of cooperating screw threads adapted to engage said second member passage second set of screw threads.

25. The column defined in claim 24 wherein:

said first end of said second member terminates at an inclined face, said inclined face being a generally planar surface oriented askew relative to said axis; and said slide lock further includes a cam member, said cam member having a cooperating cam surface for sliding engagement with said inclined face to wedge said cam member between said second member and said first member when said slide lock is in said locked position.

26. The column defined in claim 16 wherein said second member has a generally cylindrical outer surface and said bore has a corresponding, generally cylindrical cross-sectional shape.

27. The column defined in claim 26 wherein said midregion is defined by a flat area extending between said first end and said second end and said aperture has a corresponding, generally D-shaped cross-sectional shape.

28. A method for assembling a telescoping steering column for a vehicle, comprising the steps of:

providing a shaft with a first end and a midregion adjacent the first end, said shaft extending along an axis;

providing a tube which extends along an axis, said tube having a bore extending coaxially through one end of said tube and at least a portion of said tube, said bore being adapted for receiving said shaft first end and said shaft midregion in sliding engagement in an axial direction;

aligning said shaft and said tube coaxially;

positioning said shaft first end and at least a portion of said shaft midregion in said bore, in sliding engagement in an axial direction with said bore;

conforming a portion of said bore to the shape and dimension of said shaft midregion to define a crimp about said shaft midregion in sliding engagement with said shaft midregion; and providing a slide lock having a locked position wherein said shaft is fixed relative to said tube, and an unlocked position wherein said shaft slides relative to said 29. The method defined in claim 28 wherein said shaft first end has a cross-sectional area and said shaft midregion has a cross-sectional area less than said shaft first end cross-sectional area.

30. The method defined in claim 29 wherein said shaft first end and at least a portion of said shaft midregion are positioned in said bore and a portion of said bore is then conformed to the shape and dimension of said shaft midregion to define said tube crimp in sliding engagement with said shaft midregion.

31. The method defined in claim 30 further including the step of forming a flat area on a side of said shaft to define said midregion.

32. The method defined in claim 31 wherein said tube is swaged at said tube one end to define said crimp about said shaft midregion.

33. The method defined in claim 32 wherein said step of forming said flat area on said side of said shaft further includes forming a first shoulder at one end of said midregion between said shaft first end and said midregion, and forming a second shoulder at a second end of said midregion opposite said first shoulder.

34. The method defined in claim 33 wherein said step of conforming a portion of said bore to define said crimp further includes forming a first stop at one side of said crimp, and forming a second stop at a second side of said crimp opposite said first stop.

35. The method defined in claim 34 wherein said column has a telescoping range with a first limit defined by said first stop abutting said first shoulder, and a second limit defined by said second stop abutting said second shoulder.

36. The method defined in claim 28 wherein said shaft first end and at least a portion of said shaft midregion are positioned in said bore and a portion of said bore is then conformed to the shape and dimension of said shaft midregion to define said tube crimp in sliding engagement with said shaft midregion.

37. The method defined in claim 36 wherein said tube is swaged at said tube one end to define said crimp about said shaft midregion.

38. The method defined in claim 28 further including the step of forming a flat area on a side of said shaft to define said midregion.

39. The method defined in claim 38 wherein:

said step of forming said flat area on said side of said shaft further includes forming a first shoulder at one end of said midregion between said shaft first end and said midregion, and forming a second shoulder at a second end of said midregion opposite said first shoulder;

said step of conforming a portion of said bore to define said crimp further includes forming a first stop at one side of said crimp, and forming a second stop at a second side of said crimp opposite said first stop; and second side of said crimp opposite said first stop; and said column has a telescoping range with a first limit defined by said first stop abutting said first shoulder, and a second limit defined by said second stop abutting said second shoulder.

* * * * *

UNITED STATES PATENT AND TRADEMARK OFFICE
CERTIFICATE OF CORRECTION

PATENT NO. : 5,267,480
DATED : December 7, 1993
INVENTOR(S) : Joseph A. Krizan

It is certified that error appears in the above-indentified patent and that said Letters Patent is hereby corrected as shown below:

Column 4, line 55;

"midregion 3" should be --midregion 34-- therefor.

Column 4, line 65;

"ma" should be --may-- therefor.

Column 5, Line 13;

"lock aperture" should be --lock aperture 20-- therefor.

Signed and Sealed this

Sixteenth Day of August, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,267,480
DATED : December 7, 1993
INVENTOR(S) : Joseph A. Krizan

It is certified that error appears in the above-indentified patent and that said Letters Patent is hereby corrected as shown below:

Column 9, claim 28, line 58, after "said" insert --tube--.
Column 10, claim 39, line 55, delete "second side of said crimp opposite said first stop; and"

Signed and Sealed this

Thirteenth Day of September, 1994

Attest:

BRUCE LEHMAN

Attesting Officer        Commissioner of Patents and Trademarks